(12) United States Patent
Chiappetta (10) Patent No.: US 7,155,132 B2
(45) Date of Patent: *Dec. 26, 2006

(54) DYNAMIC DISTORTION CONTROL

(75) Inventor: Joseph F. Chiappetta, Shelton, CT (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/727,005

(22) Filed: Dec. 3, 2003

(65) Prior Publication Data

US 2004/0109697 A1 Jun. 10, 2004

Related U.S. Application Data

(62) Division of application No. 09/478,644, filed on Jan. 6, 2000, now Pat. No. 6,687,466.

(51) Int. Cl.
*H04B 10/00* (2006.01)
*H04B 10/04* (2006.01)

(52) U.S. Cl. ............... 398/193; 398/194; 398/115; 398/159

(58) Field of Classification Search ............... 398/115, 398/158, 159, 183, 193, 194
See application file for complete search history.

(56) References Cited

U.S. PATENT DOCUMENTS

| | | | |
|---|---|---|---|
| 4,453,133 A | 6/1984 | Travis | |
| 5,161,044 A | 11/1992 | Nazarathy et al. | |
| 5,282,072 A | 1/1994 | Nazarathy et al. | |
| 5,327,279 A | 7/1994 | Farina et al. | |
| 5,424,680 A * | 6/1995 | Nazarathy et al. | 330/149 |
| 5,430,568 A * | 7/1995 | Little et al. | 398/81 |
| 5,453,868 A | 9/1995 | Blauvelt et al. | |
| 5,625,307 A * | 4/1997 | Scheinberg | 327/113 |
| 5,694,232 A | 12/1997 | Parsay et al. | |
| 5,732,333 A * | 3/1998 | Cox et al. | 330/149 |
| 5,760,646 A * | 6/1998 | Belcher et al. | 330/149 |
| 5,798,854 A | 8/1998 | Blauvelt et al. | |
| 5,812,294 A | 9/1998 | Wilson | |
| 5,850,305 A * | 12/1998 | Pidgeon | 398/193 |
| 6,078,216 A * | 6/2000 | Proctor, Jr. | 330/151 |
| 6,122,085 A | 9/2000 | Bitler | |
| 6,147,555 A | 11/2000 | Posner et al. | |
| 6,163,395 A * | 12/2000 | Nemecek et al. | 398/198 |
| 6,178,026 B1 | 1/2001 | Yoshida | |
| 6,181,199 B1 | 1/2001 | Camp, Jr. et al. | |

(Continued)

FOREIGN PATENT DOCUMENTS

EP 0 407 919 A2 1/1991

(Continued)

OTHER PUBLICATIONS

Cheng, David K., "Field and Wave Electromagnetics", $2^{nd}$ Edition, Addison-Wesley Series, 1989, pp. 121-123, 266-269.

(Continued)

*Primary Examiner*—Dalzid Singh
(74) *Attorney, Agent, or Firm*—Fogg and Associates LLC; David N. Fogg (57) ABSTRACT

A distortion monitor for a non-linear device is provided. The control circuit includes an input coupleable to receive a signal from the non-linear device and a first frequency monitor coupled to the input. The frequency monitor monitors the level of one of even and odd order distortion at a first frequency and creates a first signal indicative of the level of the distortion without the use of a pilot tone.

21 Claims, 5 Drawing Sheets

U.S. PATENT DOCUMENTS

| | | |
|---|---|---|
| 6,211,984 B1 | 4/2001 | Yoshida |
| 6,281,936 B1 | 8/2001 | Twitchell et al. |
| 6,285,252 B1 | 9/2001 | Huang |
| 6,291,813 B1 | 9/2001 | Ackerman et al. |
| 6,304,369 B1 | 10/2001 | Piehler |
| 6,313,701 B1 | 11/2001 | Mussino et al. |
| 6,519,374 B1 | 2/2003 | Stook et al. |

FOREIGN PATENT DOCUMENTS

| | | |
|---|---|---|
| EP | 0 475 376 A2 | 3/1992 |
| EP | 0 849 897 A2 | 6/1998 |
| WO | WO 98/52304 | 11/1998 |

OTHER PUBLICATIONS

Cook, Nigel P., "Introductory DC/AC Electronics" 4th Edition, Prentice-Hall, 1999, pp. 768-772.

* cited by examiner

DYNAMIC DISTORTION CONTROL

This application is a divisional of U.S. application Ser. No. 09/478,644, filed Jan. 6, 2000, now issued as U.S. Pat. No. 6,687,466 on Feb. 3, 2004, entitled "Dynamic Distortion Control", which is incorporated herein by reference.

CROSS REFERENCE TO RELATED APPLICATIONS

This application is related to commonly assigned, co-pending application Ser. No. 09/479,298, entitled "PRE-DISTORTER WITH NON-MAGNETIC COMPONENTS FOR A NON-LINEAR DEVICE," filed on the same date as the parent application U.S. application Ser. No. 09/478,644, filed Jan. 6, 2000, now issued as U.S. Pat. No. 6,687,466 on Feb. 3, 2004. This application is incorporated herein by reference.

TECHNICAL FIELD OF THE INVENTION

The present invention relates generally to the field of telecommunications and, in particular, to dynamic distortion control.

BACKGROUND

Due to the increased demand for higher capacity in voice, data and video transmission the communications market is expanding. In particular optical fiber communications technology has been developing in response to the market requirements. Optical transmitters are one type of fiber communications technology that is evolving to meet the increased demand.

Optical transmitters that utilize pre-distortion devices for distortion cancellation are well known. Typically, these transmitters are designed around a Mach-Zehnder optical modulator. The modulator is fed from a high power laser. The laser operates in the cool white mode and provides the "light source" that has its intensity or amplitude modulated in the Mach-Zehnder device.

The optical modulation is accomplished by feeding a radio frequency (RF) modulating signal to the appropriate port of the modulator. In this way RF amplitude modulation is converted to optical amplitude modulation.

A detrimental characteristic of the optical modulator is that its optical output/RF input transfer characteristic is very non-linear; it is sinusoidal in nature. Consequently for a large modulation index (the ratio of the peak variation actually used to the maximum design variation (e.g., that variation whereby the instantaneous amplitude of the modulated carrier reaches zero) severe odd order distortion is generated. In order to overcome this distortion an external means is required to compensate for the nonlinear transfer function.

Pre-distorters have been used to in the past to minimize odd order distortions generated in the modulator. These odd order distortions are reduced by a circuit that generates its own RF distortions and then injects them into the modulator out of phase with those that are generated by the modulator. The pre-distorters have been limited in their operating bandwidth and in their absolute distortion cancellation due to the use of magnetic components used to achieve the phase inversions that operate to cancel the distortion products.

Typically, an optical transmitter also includes some circuitry to monitor the distortions introduced in the transmitter. It has been common practice to use one or more auxiliary pilot tones along with the many main carrier signals and to monitor distortion products from the pilot tones to asses the operation of the transmitter. One drawback of this technique is that it uses additional, unwanted signals. Further, these signals produce distortion products with very low energy, making the signals difficult to pick up.

For the reasons stated above, and for other reasons stated below which will become apparent to those skilled in the art upon reading and understanding the present specification, there is a need in the art for an improved mechanism to control distortion in a non-linear device, e.g., an optical transmitter.

SUMMARY

The above mentioned problems with non-linear devices and other problems are addressed by the present invention and will be understood by reading and studying the following specification. A non-linear device is provided which uses a distortion monitor to monitor distortion products generated at least in part by transmission of carrier signals to control the operation of the non-linear device.

In particular, an illustrative embodiment of the present invention includes a distortion monitor for a non-linear device, e.g., an optical transmitter. The distortion monitor includes an input coupleable to receive a signal from the non-linear device and a first frequency monitor coupled to the input. The frequency monitor monitors the level of one of even and odd order distortion at a first frequency and creates a first signal indicative of the level of the distortion without the use of a pilot tone.

DETAILED DESCRIPTION

The following detailed description refers to the accompanying drawings which form a part of the specification. The drawings show, and the detailed description describes, by way of illustration specific illustrative embodiments in which the invention may be practiced. These embodiments are described in sufficient detail to enable those skilled in the art to practice the invention. Other embodiments may be used and logical, mechanical and electrical changes may be made without departing from the scope of the present invention. The following detailed description is, therefore, not to be taken in a limiting sense.

Figure 1:
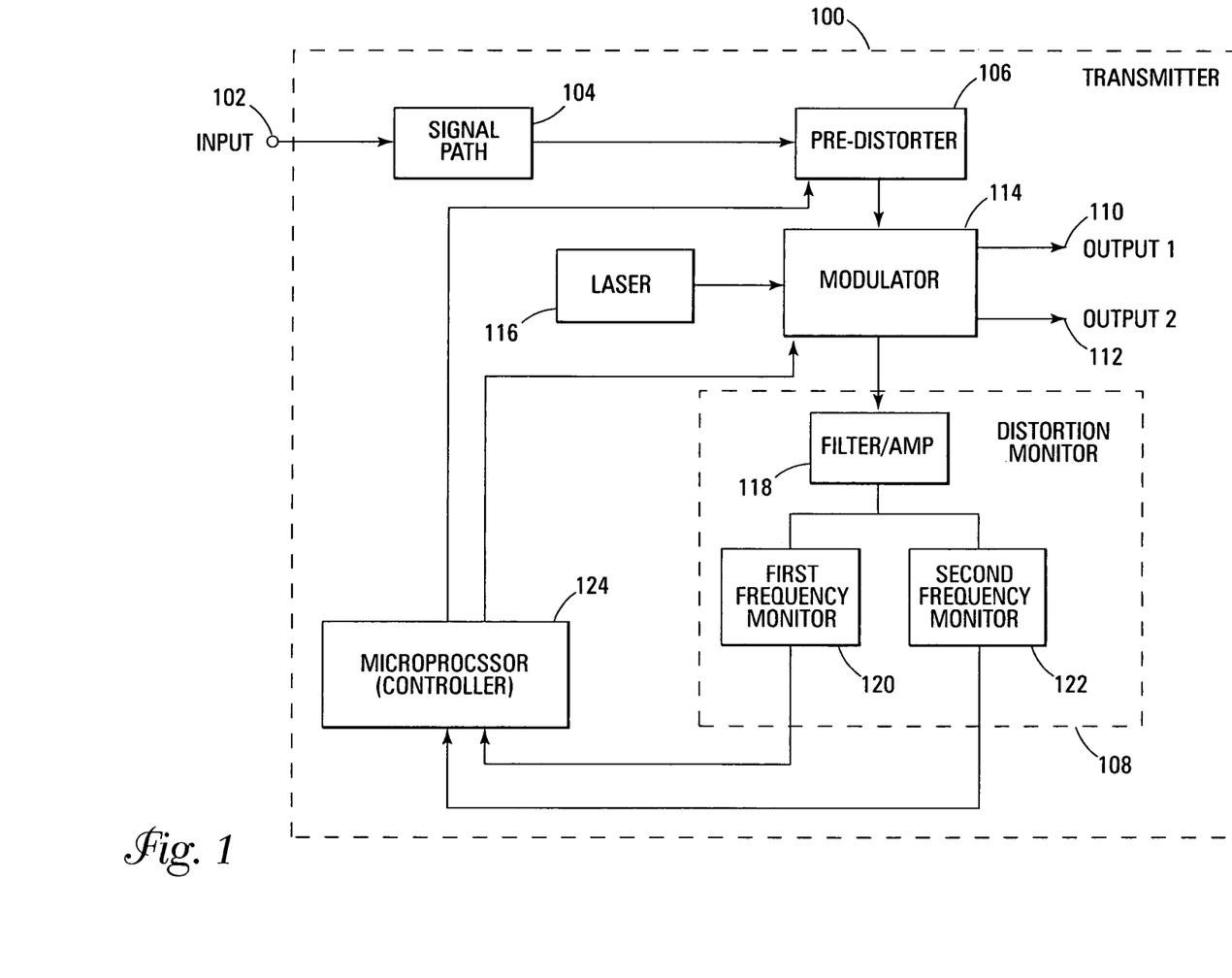
FIG. 1 is a block diagram of an embodiment of a transmitter including a distortion monitor according to the teachings of the present invention.

FIG. 1 is a block diagram of an embodiment of a transmitter, indicated generally at 100, including a distortion monitor 108 according to the teachings of the present invention. Transmitter 100 receives RF input signals at input 102 and produces optical outputs at 110 and 112. In other embodiments a single output or a plurality of outputs are provided. The RF input signals of transmitter 100 pass through signal path 104, pre-distorter 106, and modulator 114. In one embodiment, signal path 104 includes at least one amplifier, and an equalizer. In other embodiments, signal path 104 also includes an attenuator and other circuits to prepare the RF signal for transmission over an optical fiber.

Transmitter 100 converts the electrical, RF signals received at input 102 to optical signals produced by laser 116 and optical modulator 114. In one embodiment, optical modulator 114 comprises a non-linear modulator such as a Mach-Zehnder modulator. Laser 116 is coupled to modulator 114 to create the optical signals at outputs 110 and 112. Unfortunately non-linear modulators introduce distortion in the optical signal, e.g., even order and odd order distortion, produced at outputs 110 and 112. Thus, transmitter 100 includes circuitry that is used to compensate for these distortions produced by optical modulator 114.

To provide this compensation, transmitter 100 includes pre-distorter 106. In one embodiment, pre-distorter 106 is constructed according to the teachings of the Ser. No. 09/479,298 application. In other embodiments, pre-distorter 106 is constructed using more conventional pre-distorter circuits incorporating magnetic phase inversion circuits. Pre-distorter 106 is coupled between signal path 104 and modulator 114. Pre-distorter 106 adds distortion to the RF signals from signal path 104 in order to compensate for the distortion introduced by modulator 114.

Transmitter 100 also includes circuitry that selectively adjusts the operation of one of pre-distorter 106 and modulator 114 based on distortions detected in the output of modulator 114. Distortion monitor 108 is coupled to receive the output of modulator 114 at filter/amplifier 118. Filter/amplifier 118 is coupled to first and second frequency monitors 120 and 122, respectively. First and second frequency monitors 120 and 122 provide signals to microprocessor or controller 124. Microprocessor 124 uses a control algorithm, such as the algorithm described below with respect to FIG. 2, to selectively generate signals for pre-distorter 106 and modulator 114. In one embodiment, these control signals from microprocessor 124 are used to control a bias voltage for amplifiers in pre-distorter 106 and a DC bias voltage for modulator 114.

First and second frequency monitors 120 and 122 are tuned to monitor selected frequencies for potential distortion products at these selected frequencies. In one embodiment, these distortion products monitored by first and second frequency monitors 120 and 122 are generated based on actual signals received at input 102 and are not generated based on pilot tones. In another embodiment, one of the first and second frequency monitors 120 and 122 monitors signals generated, at least in part, based on a pilot tone.

In one embodiment, transmitter 100 operates with cable television (CATV) radio frequency (RF) input carrier frequencies. In a typical system, these frequencies are spaced apart at nominally 6.0 MHZ increments. The actual 6 MHZ frequency difference between carriers depends on the absolute frequency accuracy of each individual carrier. This carrier accuracy is such that the difference of each carrier from the nominal 6 MHZ is typically within zero to less than 30 kHz. Modulator 114 converts these RF carrier signals to their corresponding optical counterparts.

In one embodiment, first frequency monitor 120 monitors even-order distortions and second frequency monitor 122 monitors odd-order distortions. One way in which the even-order distortions manifest themselves follows the $f_n-f_{n+1}$ rule whereby an approximate 6 MHZ distortion product is generated for every pair of RF frequencies that are spaced apart by 6 MHZ. This results in many distortion products in the frequency spectrum at outputs 110 and 112 of transmitter 100. First frequency monitor 120 detects these even-order distortion products within the nominal 6 MHZ±30 kHz frequency range. This provides a measure of the even-order distortion of transmitter 100.

Similarly, one way in which odd-order distortions manifest themselves follows the $f_1+f_2-f_3$ rule whereby a 49.25 MHZ distortion product is generated for many combinations of RF frequencies in a multi-channel format. Again, this results in many distortion products in the frequency spectrum at outputs 110 and 112 of transmitter 100. Second frequency monitor 122 detects these odd-order distortion products within the nominal 49.25 MHZ±30 kHz frequency range. This provides a measure of the odd-order distortion of transmitter 100.

In another embodiment, distortion monitor 108 monitors distortion products generated by a pilot tone provided to pre-distorter 106. In this embodiment, odd-order distortions manifest themselves following the $f_{n+1}-f_n+f_m$ rule whereby a 49.25 MHZ distortion product is again generated for every pair of RF frequencies that are 6 MHZ spaced when mixed with a single 43.25 MHZ pilot signal ($f_m$). Again, second frequency monitor 122 detects these distortion products within the nominal 49.25 MHZ±30 kHz frequency range. This also provides a measure of the odd-order distortion of transmitter 100, with the use of a single pilot tone.

In operation, transmitter 100 receives electrical RF signals at input 102 and produces optical signals at outputs 110 and 112. The signals from input 102 are amplified and prepared for pre-distorter 106 at signal path 104. Pre-distorter 106 adds a selected distortion to the signals from signal path 104. In one embodiment, pre-distorter 106 adds odd-order distortions that are inversely related to the expected distortions for modulator 114. Laser 116 and modulator 114 combine to pass the signals from pre-distorter 106 to outputs 110 and 112.

The amount of distortion in outputs 110 and 112 of transmitter 100 is controlled by a feedback loop that monitors the distortion in the outputs 110 and 112 and provides control signals to pre-distorter 106 and modulator 114. This feedback loop includes distortion monitor 108. Distortion monitor 108 receives the output of modulator 114 at filter/amplifier 118. This signal is further provided to first and second frequency monitors 120 and 122, respectively. First frequency monitor 120, in one embodiment, monitors energy at a first selected frequency, e.g., 6 MHZ, that relates to even-order distortion products. Similarly, second frequency monitor 122 monitors, in one embodiment, energy at a second selected frequency, e.g., 49.25 MHZ, that relates to odd-order distortion products. It is noted that in some embodiments a pilot tone is used to generate at least some of the odd-order distortion products detected by second frequency monitor 122.

Distortion monitor 108 provides two output signals to microprocessor 124. First frequency monitor 120 provides a signal that is related to the amount of even order distortion in the output of modulator 114. Second frequency monitor 122 provides a signal that is related to the amount of odd-order distortion in the output of modulator 114.

Microprocessor 124 uses the signals from distortion monitor 108 to selectively create control signals for pre-distorter 106 and modulator 114. For example, microprocessor 124 selectively generates a control signal for pre-distorter 106 that controls at least one bias current for an amplifier in pre-distorter 106. Microprocessor 124 also selectively generates a second control signal for modulator 114 that controls a DC bias voltage for modulator 114.

Figure 2:
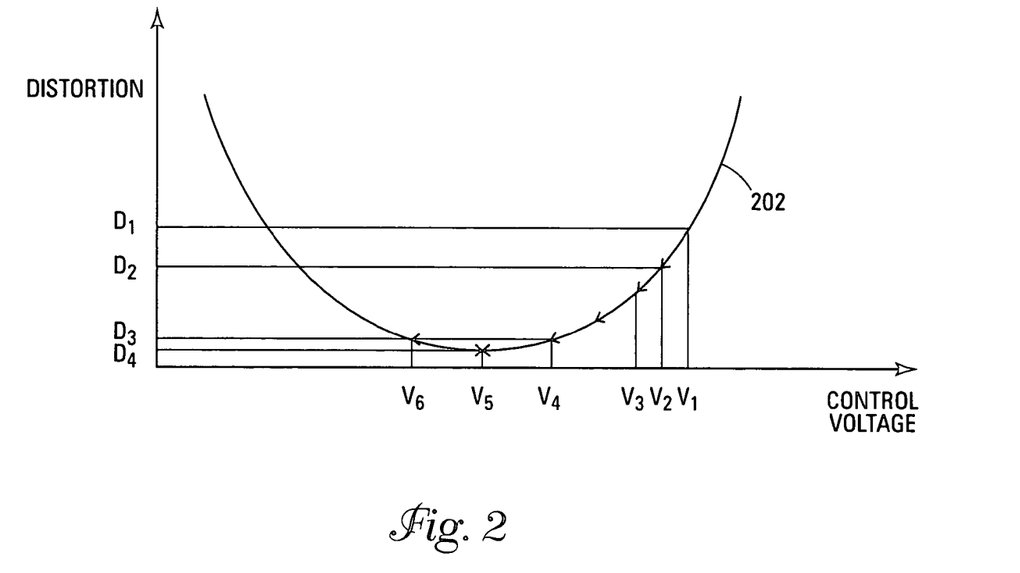
FIG. 2 is a graph that illustrates an embodiment of a process for generating a control voltage to control the distortion in a modulator according to the teachings of the present invention.

Microprocessor 124 implements a control algorithm depicted graphically in FIG. 2 to generate these control signals for pre-distorter 106 and modulator 114. For purposes of simplicity, the graph of FIG. 2 is described in terms of generating the control signal for modulator 114. However, it is understood, that a similar routine is used to generate a control voltage for pre-distorter 106.

At the beginning of the algorithm, microprocessor 124 outputs an initial value labeled as $V_1$ in FIG. 2. This voltage is a preset value that presupposes an acceptable setting for modulator 114. Due to temperature and component aging, the setting will not normally be the final setting established by microprocessor 124. At the initial setting, $V_1$, distortion monitor 108 provides a signal indicating to microprocessor 124 that distortion level is $D_1$. Because this is a single measurement, the algorithm implemented by microprocessor 124 does not know where this point lies on curve 202. Thus, microprocessor 124 adjusts the control voltage to a value $V_2$ that is higher or lower than $V_1$. Microprocessor 124 than receives an updated distortion reading, $D_2$, from distortion monitor 108. In FIG. 2, distortion level $D_2$ is depicted as being lower than the distortion level $D_1$. Thus microprocessor 124 determines that the control voltage was correctly lowered to reduce the distortion level and again lowers the control voltage to voltage $V_3$. It is noted that when lowering the control voltage results in a higher distortion level, microprocessor 124 raises the control voltage to try to move the distortion level lower. Once microprocessor 124 has determined that the control voltage is moving in the correct direction, microprocessor 124 continues to modify the control voltage until the change in the control voltage results in increasing distortion such as the situation depicted with voltage $V_6$. At this point, microprocessor 124 returns the control voltage to the level preceding level that increased distortion, e.g., $V_5$. Microprocessor 124 further continuously uses this process to output control voltages as changes in the distortion level are detected in order to maintain a control voltage that keeps distortion at a relative minimum.

Figure 3:
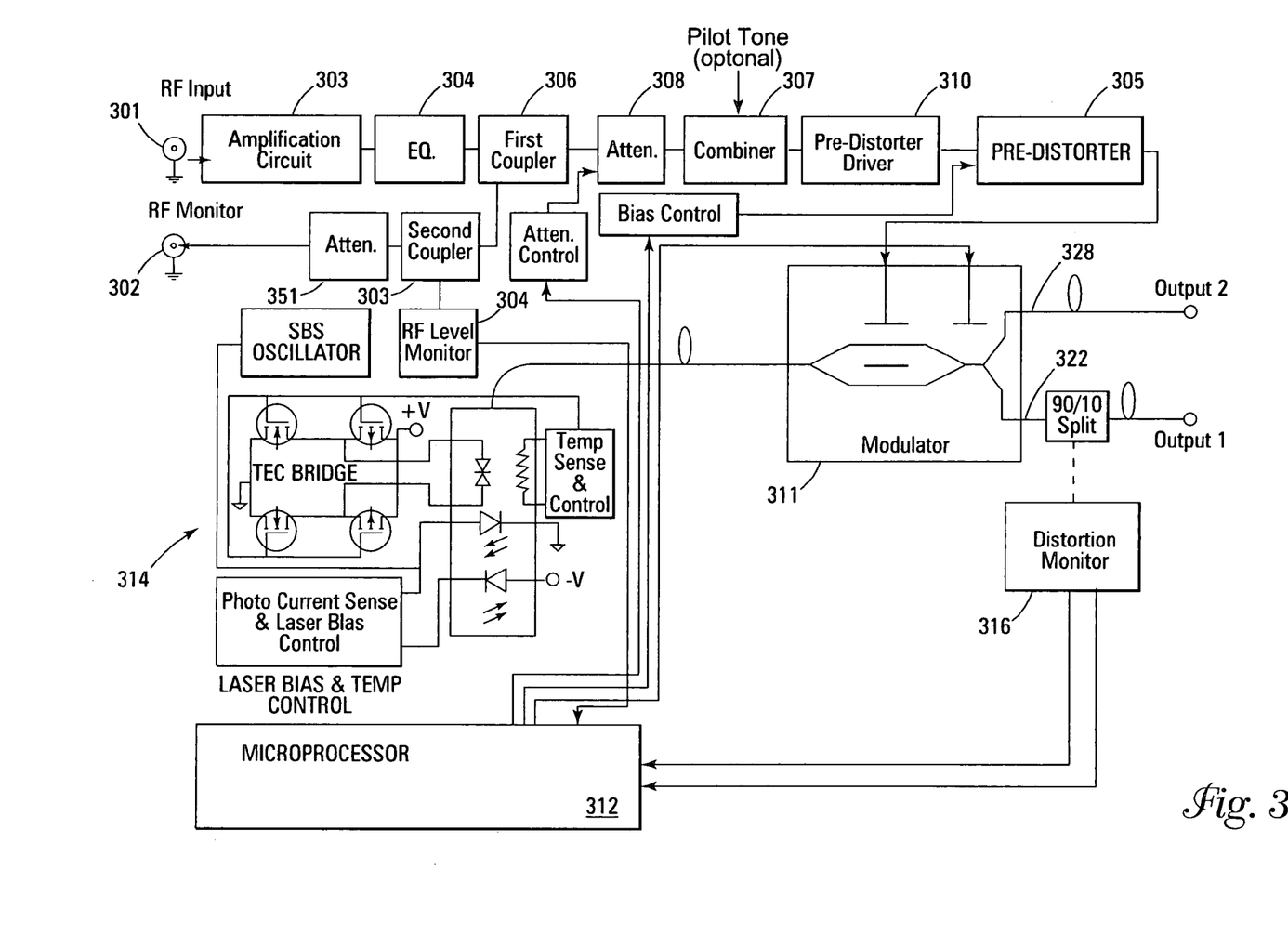
FIG. 3 is a block diagram of another embodiment of a transmitter including a distortion monitor according to the teachings of the present invention.

FIG. 3 is a block diagram of another embodiment of a transmitter, indicated generally at 300, including a distortion monitor 316 according to the teachings of the present invention. The transmitter receives RF input signals at RF input 301 and the signals are fed to an amplification circuit 303 where the signals are amplified and fed to an equalizer 304. The equalizer 304 receives the amplified signals equalizes the signals and feeds them to a first coupler 306. The first coupler 306 samples the equalized signals and feeds the sampled signals to a second coupler 303 which splits the sampled signals for transmission to an attenuator 351 and an internal RF level monitor 304. The attenuator 351 receives the split signals, attenuates them and feeds the signals to an external RF monitor through RF output 302. The internal RF level monitor 304 receives the split signals and feeds the signals to a microprocessor 312 for monitoring and control.

In addition, the coupler 306 feeds the equalized signals to an attenuator 308. The attenuator 308 receives the equalized signals and attenuates the signals. In one embodiment the attenuator feeds the attenuated signals to a pre-distorter driver 310. In other embodiments the attenuator 308 feeds the attenuated signals to a combiner 307 and the signals are then fed to a pre-distorter driver 310. The combiner 307 adds a pilot tone as detectable distortion to the attenuated signals.

The pre-distorter driver 310 receives the signals, amplifies the signals and feeds the amplified signals to a pre-distorter 305.

The pre-distorter 305 generates odd order distortions for input to a modulator 311. In one embodiment the modulator 311 is an optical modulator and in another embodiment the modulator is a Mach Zehnder modulator. The odd order distortions generated by the pre-distorter 305 are complimentary to distortions generated by the modulator 311. The complimentary signals are substantially equal in magnitude to the distortions for modulator 311 but are 180 degrees out of phase with the distortions of modulator 311. The pre-distorter 305 feeds the signals with the complimentary distortions to the modulator 311. The modulator 311 is coupled to a laser bias and temperature control device 314 which provides a light source for modulation by the modulator 311. The modulator 311 receives the RF signals and the light source and generates modulated optical outputs 320 and 322. The modulator is nonlinear and produces odd-order distortions in addition to the optical outputs 320 and 322. For a large modulation index the odd-order distortions are severe. The complimentary odd order distortions created by the pre-distorter 305 substantially reduce the distortions created by the modulator 311.

In this embodiment a distortion monitor 316 monitors the output signal 322 of the modulator 311 for the presence of distortion products at one or more frequencies, e.g., even and odd order distortion products. The distortion monitor 316 receives the output of modulator 311 and provides the monitored distortion levels to the microprocessor 312 to generate control signals. The microprocessor 312 also receives signals from the RF level monitor 304. The microprocessor 312 provides output signals based on input signals from RF level monitor 304 to an attenuation control device 305 to control the operation of attenuator 308.

In this embodiment the transmitter 300 is a 1550 nm wavelength external modulation transmitter. In other embodiments, transmitter 300 comprises an optical transmitter that uses direct modulation. In further embodiments, other wavelengths are used.

Figure 4:
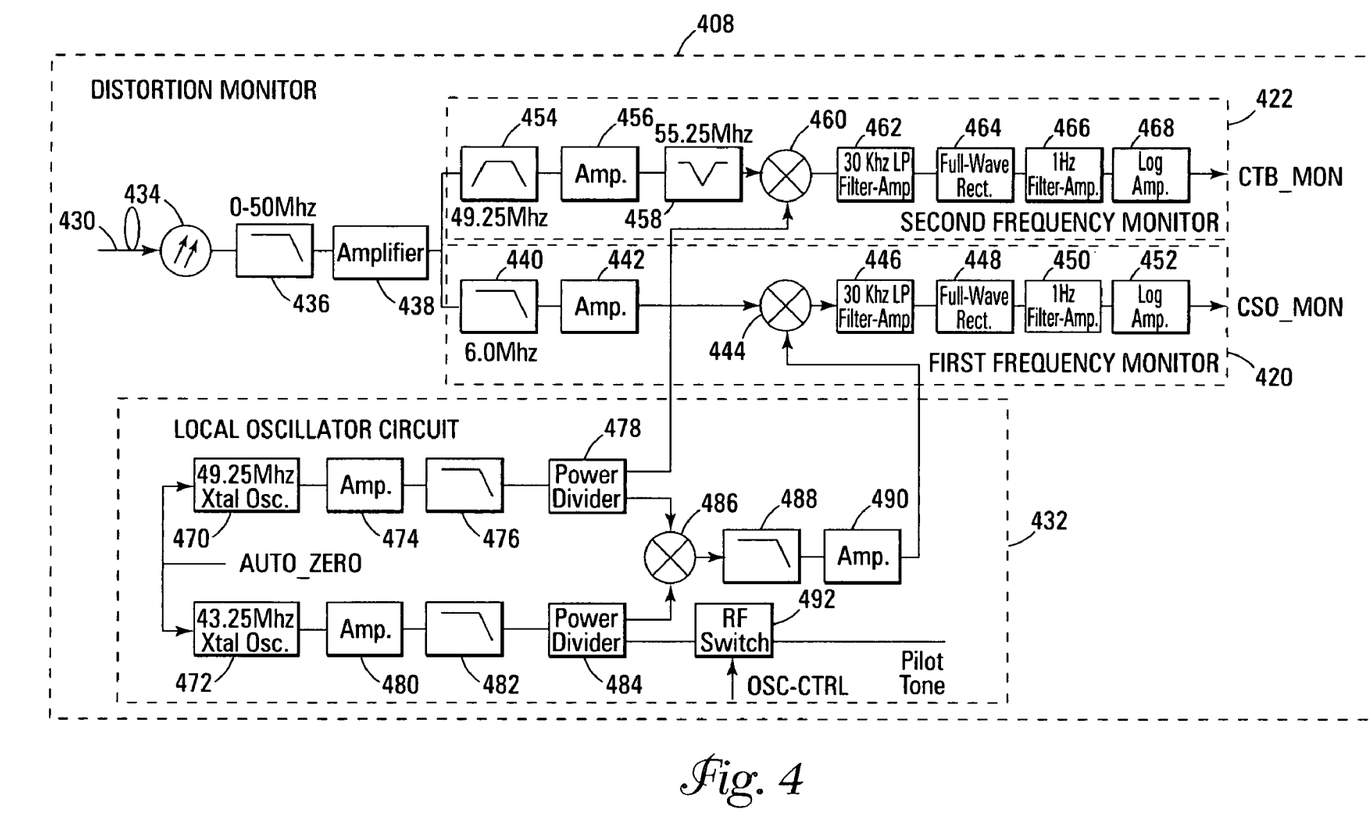
FIG. 4 is a block diagram of an embodiment of a distortion monitor according to the teachings of the present invention.

FIG. 4 is a block diagram of an embodiment of a distortion monitor, indicated generally at 408, according to the teachings of the present invention. Distortion monitor 408 monitors the output of an optical modulator, such as a Mach Zehnder modulator, to determine the presence of even- and odd-order distortion products. Distortion monitor 408 includes first frequency monitor 420 and second frequency monitor 422. First and second frequency monitors 420 and 422 each include a mixer that is controlled by local oscillator circuits 432. First frequency monitor 420 is tuned to identify distortion products located in the 6 MHZ range. Similarly, second frequency monitor 422 is tuned to identify distortion products located in the 49.25 MHZ range.

Distortion monitor 408 includes input 430 that is coupled to circuitry that prepares the output of an optical modulator for input to the first and second frequency monitors 420 and 422. The signals received at input 430 are detected by photo diode 434. Photo diode 434 is coupled to low pass filter 436 to filter out as much of the carrier frequency energy above 50 MHZ as possible. This reduces the load on the front end of distortion monitor 408 since the carriers are typically 60 to 70 dB greater than the distortion products. Low pass filter 436 provides its signal to amplifier 438. Amplifier 438 provides, for example, 20 dB of distortion gain and establishes the signal-to-noise ratio of distortion monitor 408.

The output of amplifier 438 is split into two paths; a first path passing through first frequency monitor 420 and a second path passing through second frequency monitor 422. In both paths, the output of amplifier 438 is down-converted to low audio frequency "base-band" signals by mixing the output of amplifier 438 with 6 MHZ and 49.25 MHZ signals, respectively, from local oscillator circuit 432 using double-balanced mixers. The base-band signals are further processed to produce output signals indicative of the distortion products found in the output of the optical modulator.

First frequency monitor 420 monitors distortion products located at 6 MHZ±30 kHz. First frequency monitor 420 includes low pass filter 440 and amplifier 442 that are coupled in series between amplifier 438 and mixer 444. Low pass filter 440 rejects signals above 6 MHZ. Amplifier 442 further boosts the level of the distortion products in this frequency range. Mixer 444 down-converts the distortion products to base-band.

The output of mixer 444 is coupled to the series combination of filter/amplifier 446, full wave rectifier 448, filter/amplifier 450, and log amplifier 452. In one embodiment, filter/amplifier 446 has a 30 kHz bandwidth to simultaneously limit the noise power and also allow for as much distortion energy as possible to drive full wave rectifier 448. In one embodiment, filter/amplifier 450 comprises a 1 Hz active filter that filters the output of full wave rectifier 448. Log amplifier 452 increases the operating dynamic range of distortion monitor 408 by compressing the normally large signal swing that would result from using a linear high gain amplifier. The final DC output level of log amplifier 452 represents a measure of the even-order distortion products of the optical modulator. Small DC levels at the output of log amplifier 452 represents lower levels of distortion products.

Second frequency monitor 422 monitors distortion products located at 49.25 MHZ±30 kHz. Second frequency monitor 422 includes bandpass filter 454, amplifier 456, and notch filter 458 that are coupled in series between amplifier 438 and mixer 460. The pass band of bandpass filter 454 includes the 49.25 MHZ frequency. Amplifier 456 further boosts the level of the distortion products in this frequency range. In one embodiment, notch filter 458 is included to suppress carriers above the 49.25 MHZ frequency, e.g., the 55.25 MHZ carrier, in order to pass the 49.25 MHZ distortion products. Mixer 460 down-converts the distortion products to base-band.

The output of mixer 460 is coupled to the series combination of filter/amplifier 462, full wave rectifier 464, filter/amplifier 466, and log amplifier 468. In one embodiment, filter/amplifier 462 has a 30 kHz bandwidth to simultaneously limit the noise power and also allow for as much distortion energy as possible to drive full wave rectifier 464. In one embodiment, filter/amplifier 466 comprises a 1 Hz active filter that filters the output of full wave rectifier 464. Log amplifier 468 increases the operating dynamic range of distortion monitor 408 by compressing the normally large signal swing that would result from using a linear high gain amplifier. The final DC output level of log amplifier 468 represents a measure of the odd-order distortion products of the optical modulator. Small DC levels at the output of log amplifier 452 represents lower levels of distortion products.

Local oscillator circuit 432 provides inputs to mixers 444 and 460 of first and second frequency monitors 420 and 422, respectively. Local oscillator circuit 432 includes first and second crystal oscillators 470 and 472. In one embodiment, the first crystal oscillator 470 comprises a 49.25 MHZ oscillator and second crystal oscillator 472 comprises a 43.25 MHZ crystal oscillator. First and second crystal oscillators 470 and 472 receive a control signal labeled AUTO_ZERO that is used to turn the oscillators on or off.

First crystal oscillator 470 generates the local oscillator signal for mixer 460. First crystal oscillator 470 includes an output that is coupled through amplifier 474, filter 476, and power divider 478 to an input of mixer 460. This input of mixer 460 receives a 49.25 MHZ local oscillator signal.

First and second crystal oscillators 470 and 472 combine to provide a local oscillator input for mixer 444. Second crystal oscillator 472 includes an output that is coupled to the series combination of amplifier 480, filter 482, and power divider 484. Power dividers 478 and 484 each provide an input to mixer 486. Mixer 486 provides a local oscillator signal, e.g., a 6 MHZ signal, to mixer 444 through filter 488 and amplifier 490.

In one embodiment, second crystal oscillator 472 also is used to provide a pilot tone to be injected into the signal provided to the modulator. This pilot tone is taken from power divider 484 and selectively provided to the modulator by RF switch 492 under the control of a signal labeled OSC-CTRL.

Figure 5:
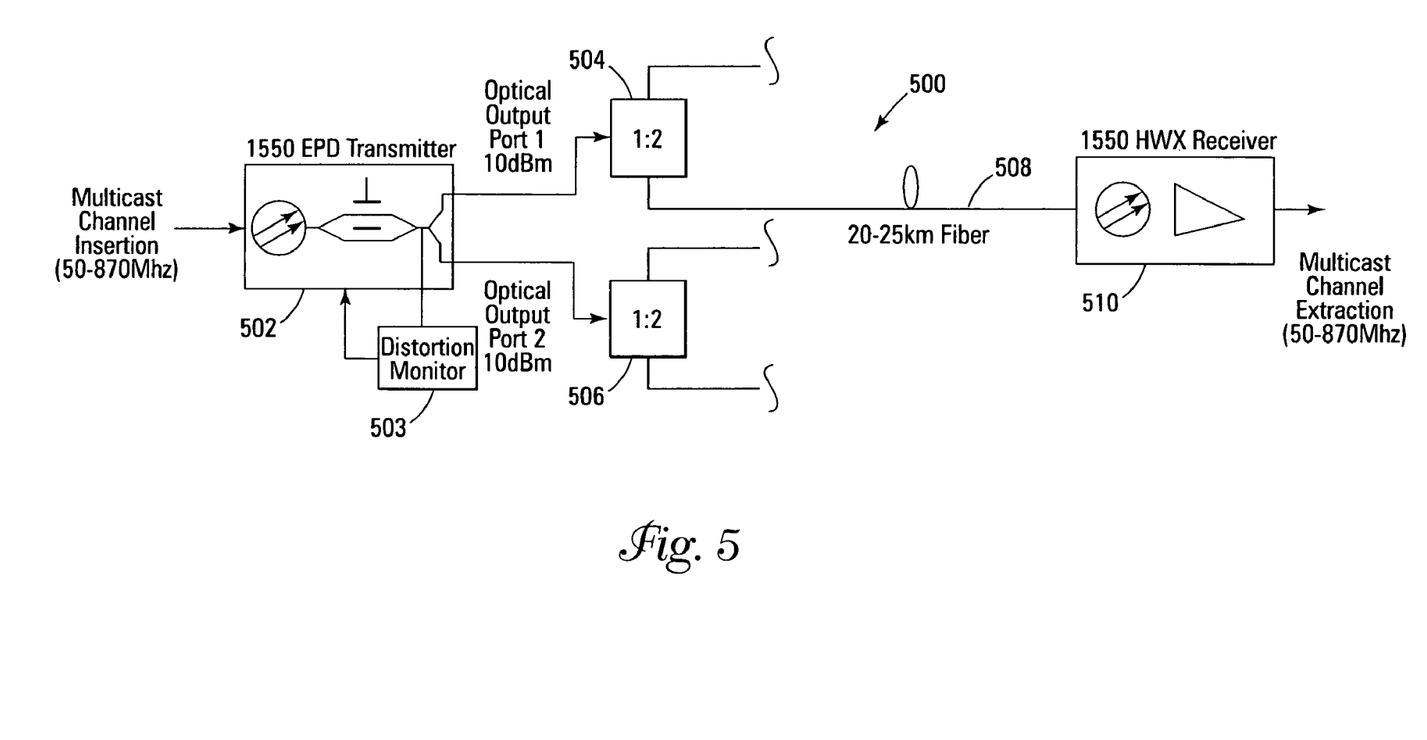
FIG. 5 is a block diagram of an embodiment of a system including a transmitter with a distortion monitor according to the teachings of the present invention.

FIG. 5 is a block diagram of an embodiment of a system, indicated generally at 500, including transmitter 502 with distortion monitor 503 according to the teachings of the present invention. In one embodiment, system 500 transports cable television (CATV) channels, e.g., 80 to 112 channels, between two distant locations via an optical link. The optical link is preferred over a coaxial copper cable link because the fiber optic link provides a wider bandwidth and lower loss.

System 500 includes transmitter 502 that is coupled to receive multicast channel insertion, e.g., RF signals between 50 and 870 MHZ. Transmitter 502 comprises, for example, the transmitter shown in FIGS. 1 or 3 above. Transmitter 502 is coupled to distortion monitor 503 which monitors distortion products in the output of transmitter 502 and provides control signals to transmitter 502 in order to reduce distortion products in its output. Distortion monitor 503, in one embodiment, is constructed as shown and described above with respect to FIGS. 1, 2, 3, and 4.

Transmitter 502 provides output to splitters 504 and 506 to increase the number of paths that can be supported by transmitter 502. Each path supported by transmitter 502 includes a fiber-optic cable 508. In one embodiment, fiber-optic cable 508 has a length from 20 to 25 kilometers. Fiber-optic cable 508 is terminated by a receiver 510 that converts the optical signal back to an electrical signal for transmission over coaxial cable.

CONCLUSION

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, the distortion monitor can monitor distortion products at any appropriate frequency and is not limited to distortion products at 6 MHZ and 49.25 MHZ. Rather, the specific frequency is chosen to be a frequency outside the channel raster alignment at a frequency representative of even or odd order distortions. Further, the components in the first and second frequency monitors can be adjusted as necessary to allow for monitoring distortion products at selected frequencies. Further, any appropriate local oscillator arrangement can be used to create the local oscillator signals for the first and second frequency monitors. Further, in some embodiments, only one frequency monitor is provided, e.g., to monitor even or odd order distortion at a single frequency. In other embodiments, the signals from the distortion monitor are provided as output for use in manual control of the non-linear device. Further, in other embodiments, the distortion monitor is used with non-linear devices other than an optical transmitter.

What is claimed is:

1. A transmitter, comprising:
an input, coupleable to receive an RF signal;
a pre-distorter, coupled to the input, that selectively adds distortion to the RF signal;
a laser that provides a light source for optical transmission;
a modulator, coupled to the laser and the pre-distorter, that modulates the light from the laser with the RF signal from the pre-distorter to produce an output for the transmitter;
wherein the distortion added by the pre-distorter is controlled to reduce distortions in the output of the transmitter generated by the modulator;
a distortion monitor, coupled to the output of the transmitter, that monitors at least one frequency of the output of the transmitter to detect distortion in the modulator output without the use of a pilot tone; and
a microprocessor, coupled to the distortion monitor, the pre-distorter, and the modulator that uses an output of the distortion monitor to selectively generate control signals for the modulator and the pre-distorter to reduce the distortion in the output of the transmitter.

2. The transmitter of claim 1, wherein the modulator is a Mach-Zehnder modulator.

3. The transmitter of claim 1, wherein the distortion monitor includes a first frequency monitor that monitors a first frequency for distortion products and a second frequency monitor that monitors a second, different frequency for distortion products.

4. The transmitter of claim 3, wherein the first frequency monitor includes at least one filter and a mixer that select the first frequency and down convert the first frequency to the base-band signal.

5. The transmitter of claim 3, wherein the first and second frequency monitors include double balanced mixers.

6. The transmitter of claim 3, wherein:
the first frequency monitor monitors first distortion products at a frequency outside an associated channel raster alignment, wherein the frequency is representative of one of odd or even order distortion; and
the second frequency monitor monitors second distortion products at a frequency outside an associated channel raster alignment, wherein the frequency is representative of one of odd or even order distortion.

7. The transmitter of claim 1, wherein the at least one control signal generated by the microprocessor comprises first and second control signals, wherein the first control signal controls a bias voltage for the pre-distorter and the second control controls a DC bias for the modulator.

8. The transmitter of claim 1, and further including a pilot tone generator that selectively adds distortion detectable at the second frequency.

9. A method for controlling a non-linear device, the method comprising:
receiving an output signal of the non-linear device;
monitoring the output signal for distortion at a first selected frequency;
generating signals indicative of a level of distortion at the monitored first frequency; and
when the signal indicates excessive distortion is present in the output signal, processing the signal indicative of a level of distortion in a microprocessor to selectively generate control signals for the non-linear device and a pre-distorter to reduce the distortion.

10. The method of claim 9, wherein receiving an output signal comprises receiving an output signal from a Mach-Zehnder modulator.

11. The method of claim 9, wherein monitoring the output signal comprises monitoring the output signal for distortions at a frequency outside a channel raster alignment, wherein the frequency is representative of one of odd or even order distortion.

12. The method of claim 9, wherein monitoring the output signal comprises:
filtering the output signal to isolate one of the first and second selected frequencies;
down converting the signal at the selected frequency to create a base-band signal;
filtering the base-band signal;
rectifying the base-band signal with a full wave rectifier to produce a rectified signal; and
filtering and amplifying the rectified signal to produce a measure of the distortion of the output signal of the non-linear device.

13. The method of claim 9, wherein generating at least one control signal comprises selectively generating a control signal to set the DC bias of the non-linear device and a control signal to establish a bias voltage for the pre-distorter.

14. A control circuit for dynamic distortion control in an optical transmitter, the control circuit comprising:
a photo diode coupleable to receive an optical output signal from a modulator of the transmitter and providing an electrical output;
a first frequency monitor, coupled to the electrical output of the photodiode, the first frequency monitor comprising:
a filter that includes a first frequency in its frequency band,
an amplifier coupled to the filter,
a first mixer, coupled to the amplifier to down-convert the first frequency to base-band;
a full-wave rectifier coupled to the output of the first mixer, and
a log amplifier coupled to the full-wave rectifier that outputs a first signal indicative of the level of the distortion at the first frequency without the use of a pilot tone;
a second frequency monitor, coupled to the electrical output of the photodiode, the first frequency monitor comprising:
a filter that includes a second frequency in its frequency band,
an amplifier coupled to the filter,
a notch filter coupled to the amplifier,
a second mixer, coupled to the amplifier to down-convert the second frequency to base-band;
a full-wave rectifier coupled to the output of the second mixer, and
a log amplifier coupled to the full-wave rectifier that outputs a second signal indicative of the level of the distortion at the second frequency; and
a controller, coupled the first and second frequency monitors to receive the first and second signals and to selectively create at least one control signal for one of the modulator and a pre-distorter.

15. A transmission system, comprising:
- at least one optical transmitter with an input coupleable to receive input data and providing at least one optical output;
- at least one optical link coupled to each of the at least one optical output;
- an optical receiver coupled to each of the at least one optical link;
- the optical transmitter including an optical modulator and a pre-distorter circuit, wherein the pre-distorter generates distortions to reduce distortions in the output of the optical transmitter; and
- a control circuit for dynamic distortion control in the optical transmitter, the control circuit comprising:
  - an input coupleable to receive a signal from the optical modulator of the transmitter;
  - a first frequency monitor, coupled to the input, that monitors the level of distortion at a first frequency and that creates a first signal indicative of the level of the distortion without the use of a pilot tone; and
  - a controller, coupled to the first frequency monitor to receive the first signal and to selectively create control signals for the modulator and the pre-distorter.

16. The system of claim 15, wherein the first frequency monitor includes at least one filter and a mixer that select the first frequency and down convert the frequency to baseband.

17. The system of claim 15, and further including a second frequency monitor, coupled to the input, that monitors the level of distortion at a second frequency and that creates a second signal indicative of the level of the distortion.

18. The system of claim 17, wherein the first and second frequency monitors include double balanced mixers.

19. The system of claim 17, wherein:
- the first frequency monitor monitors first distortion products at a frequency outside an associated channel raster alignment, wherein the frequency is representative of one of odd or even order distortion; and
- the second frequency monitor monitors second distortion products at a frequency outside an associated channel raster alignment, wherein the frequency is representative of one of odd or even order distortion.

20. The system of claim 15, wherein the controller generates first and second control signals, wherein the first control signal controls a bias voltage for the pre-distorter and the second control controls a DC bias for the optical modulator.

21. The system of claim 15, and further including a pilot tone generator that selectively adds distortion detectable at the second frequency.

* * * * *